(12) United States Patent
Dayalan et al.

(10) Patent No.: US 12,210,436 B2
(45) Date of Patent: Jan. 28, 2025

(54) RANKING USER INTERFACE ELEMENTS BASED ON PHYSICAL CONDITIONS

(71) Applicant: Trane International Inc., Davidson, NC (US)

(72) Inventors: Udhaya Kumar Dayalan, White Bear Lake, MN (US); Thomas Christopher Basterash, East Bethel, MN (US); Mark Martin, Chisago City, MN (US)

(73) Assignee: Trane International Inc., Davidson, NC (US)

( * ) Notice: Subject to any disclaimer, the term of this patent is extended or adjusted under 35 U.S.C. 154(b) by 163 days.

(21) Appl. No.: 16/423,691

(22) Filed: May 28, 2019

(65) Prior Publication Data

US 2020/0379870 A1    Dec. 3, 2020

(51) Int. Cl.
  *G06F 11/34*   (2006.01)
  *G06F 9/451*   (2018.01)
  *H04L 12/28*   (2006.01)

(52) U.S. Cl.
  CPC .......... *G06F 11/3476* (2013.01); *G06F 9/451* (2018.02); *G06F 11/3409* (2013.01); *G06F 11/3438* (2013.01); *H04L 12/2827* (2013.01)

(58) Field of Classification Search
  CPC ................ G05B 23/00; G05B 23/0297; G05B 23/0216; G05D 23/00; H05B 27/0281; H05B 33/0896; G06F 3/04812; G06F 3/0482; G06F 3/0484; G06F 3/0488; G06F 11/3476; G06F 9/451; G06F 11/3409; G06F 11/3438; H04L 12/2877
  See application file for complete search history.

(56) References Cited

U.S. PATENT DOCUMENTS

| 6,820,111 B1 | 11/2004 | Rubin et al. |
| 6,959,319 B1 | 10/2005 | Huang et al. |
| 7,185,274 B1 | 2/2007 | Rubin et al. |
| 7,346,668 B2 | 3/2008 | Willis |
| 7,877,691 B2 | 1/2011 | Goering et al. |
| 7,885,981 B2 | 2/2011 | Kaufman et al. |
| 7,925,691 B2 | 4/2011 | Westphal |
| 8,055,602 B2 | 11/2011 | Tirpak et al. |

(Continued)

FOREIGN PATENT DOCUMENTS

| CA | 2607897 C | * | 3/2014 | ............. G09B 25/06 |
| CA | 3045664 A1 | * | 6/2018 | ............. G06F 3/011 |

(Continued)

*Primary Examiner* — Steven P Sax
(74) *Attorney, Agent, or Firm* — WOMBLE BOND DICKINSON (US) LLP

(57) ABSTRACT

Architectures or techniques are presented that can learn relationships between graphical elements presented by a user interface and physical conditions that exist in an environment. Furthermore, the architectures or techniques can, potentially based on the learned information, present the graphical elements to the user interface in a manner that is determined to be more efficient. For example, graphical elements that were historically accessed when a particular physical condition is true can be identified. These identified graphical elements can then be presented in a location of the user interface that is determined to be favorable to rapid or efficient selection at times with the particular physical condition is determined to be satisfied.

6 Claims, 11 Drawing Sheets

(56) References Cited

U.S. PATENT DOCUMENTS

| | | | |
|---|---|---|---|
| 8,099,178 | B2 | 1/2012 | Mairs et al. |
| 8,271,901 | B2 | 9/2012 | Gherardi |
| 8,359,237 | B2 | 1/2013 | Dalal et al. |
| 8,493,407 | B2 | 7/2013 | Arrasvuori |
| 9,563,336 | B2 | 2/2017 | Barak et al. |
| 9,652,777 | B2 | 5/2017 | Tapley et al. |
| 10,101,870 | B2 | 10/2018 | Ali et al. |
| 10,453,353 | B2 * | 10/2019 | Russell ............... G06F 40/284 |
| 10,620,766 | B2 * | 4/2020 | Kim .................... G06F 3/044 |
| 2007/0247767 | A1 * | 10/2007 | Zhang ................. H02H 3/006 361/42 |
| 2008/0046217 | A1 * | 2/2008 | Polonskiy ........... G01J 3/2823 702/179 |
| 2009/0222757 | A1 * | 9/2009 | Gupta ................. H04N 5/44543 715/776 |
| 2011/0047418 | A1 * | 2/2011 | Drees ................. H02J 13/0062 714/57 |
| 2011/0286138 | A1 * | 11/2011 | Shi ..................... G05D 23/2401 361/86 |
| 2012/0083336 | A1 * | 4/2012 | Ocko .................. A63F 13/798 463/31 |
| 2013/0085609 | A1 * | 4/2013 | Barker ................ H04L 67/12 700/276 |
| 2013/0085615 | A1 * | 4/2013 | Barker ................ A61G 10/00 700/277 |
| 2014/0108978 | A1 * | 4/2014 | Yu ...................... G06F 3/0482 715/765 |
| 2014/0151456 | A1 * | 6/2014 | McCurnin ......... G05D 23/1905 236/51 |
| 2014/0316743 | A1 * | 10/2014 | Drees .................. G05B 23/00 702/184 |
| 2015/0363481 | A1 * | 12/2015 | Haynes ................ G06Q 10/10 707/748 |
| 2016/0026341 | A1 * | 1/2016 | Kraev ................. G06F 3/04817 715/835 |
| 2016/0224047 | A1 * | 8/2016 | Dzuban ................ G05F 1/66 |
| 2016/0259840 | A1 | 9/2016 | Zheng et al. |
| 2017/0238401 | A1 * | 8/2017 | Sadwick ............. H05B 47/195 315/294 |
| 2018/0113576 | A1 * | 4/2018 | Bauchot .............. G06F 40/166 |
| 2018/0182475 | A1 * | 6/2018 | Cossler ................ G16H 50/50 |
| 2018/0300047 | A1 * | 10/2018 | Thrun ................. H05B 6/668 |
| 2019/0065029 | A1 * | 2/2019 | Brody ................. G06F 3/0482 |
| 2019/0322154 | A1 * | 10/2019 | Ganguly ............ B60H 1/00742 |
| 2019/0339688 | A1 * | 11/2019 | Cella ................. G05B 19/41865 |
| 2021/0034668 | A1 * | 2/2021 | Chen .................. G06F 16/743 |

FOREIGN PATENT DOCUMENTS

| | | | | |
|---|---|---|---|---|
| CA | 2916595 C | * | 8/2020 | ............... G06F 8/65 |
| CN | 108073340 A | * | 5/2018 | ......... G06F 3/04817 |
| CN | 109373530 A | * | 2/2019 | |
| CN | 109507905 A | * | 3/2019 | |
| CN | 110131799 A | * | 8/2019 | |
| CN | 108981082 B | * | 9/2020 | ............. F24F 11/42 |
| CN | 111954784 A | * | 11/2020 | ............. F24F 11/64 |
| CN | 109630902 B | * | 4/2021 | .............. F17D 5/02 |
| CN | 115113629 A | * | 9/2022 | ............. B60Q 1/50 |
| CN | 111486557 B | * | 2/2024 | ........... F24F 11/0001 |
| EP | 3467839 A1 | * | 4/2019 | ............ G06Q 10/10 |
| ES | 2732240 T3 | * | 11/2019 | ............. F25B 49/02 |
| FR | 3037105 A1 | * | 12/2016 | ........... F01N 13/107 |
| JP | 3636272 B2 | * | 4/2005 | ........... G06F 3/0481 |
| JP | 6652090 B2 | * | 2/2020 | ........... B60W 30/00 |
| KR | 20130122430 A | * | 11/2013 | |
| WO | WO-2009062761 A1 | * | 5/2009 | ............... G09G 5/00 |

* cited by examiner

RANKING USER INTERFACE ELEMENTS BASED ON PHYSICAL CONDITIONS

TECHNICAL FIELD

The present disclosure is directed to systems, apparatuses, and methods for ranking graphical elements of a user interface based on physical conditions, and more particularly, to ordering a presentation of the graphical elements based on the rank.

BACKGROUND

A user interface for a building automation system (BAS) or another suitable system can provide users with a wealth of information. By navigating various menus or lists provided by the user interface, very specific information can be acquired.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description to follow.

According to an embodiment of the present disclosure, a device can comprise a processor and a memory that stores executable instructions that, when executed by the processor, facilitate performance of operations. The computer executable instructions can comprise receiving environment data. The environment data can be indicative of a physical quantity of a physical environment. The environment data can be received from an environment control device that is configured to monitor or manage the physical environment. The computer executable instructions can comprise instructing a user interface device to present a group of graphical elements. The group of graphical elements can be representative of the physical environment or the environment control device. The computer executable instructions can comprise, in response to input to the user interface device that selects a graphical element of the group of graphical elements, determining that the physical quantity satisfies a defined condition. The computer executable instructions can further comprise incrementing a rank value assigned to the graphical element. The rank value can be indicative of a contextual rank for the graphical element in a context of the physical quantity satisfying the defined condition.

According to an embodiment of this disclosure, the computer executable instructions can comprise receiving environment data indicative of a physical quantity. The environment data can be received from an environment control device, from a data store, or another suitable source. The computer executable instructions can further comprise interfacing to a user interface device configured to present a group of graphical elements. The group of graphical elements can be representative of a physical environment or an environment control device. The computer executable instructions can comprise determining that the physical quantity satisfies a defined condition and in response, instructing the user interface device to present the group of graphical elements according to an ordering protocol. The ordering protocol can be a protocol that orders the group of graphical elements by a respective rank value. The rank value can be assigned as a function of the defined condition being determined to be satisfied.

In some embodiments, elements described in connection with the systems above can be embodied in different forms such as a computer-implemented method, a computer-readable medium, or another form.

DETAILED DESCRIPTION

Overview

Figure 1:
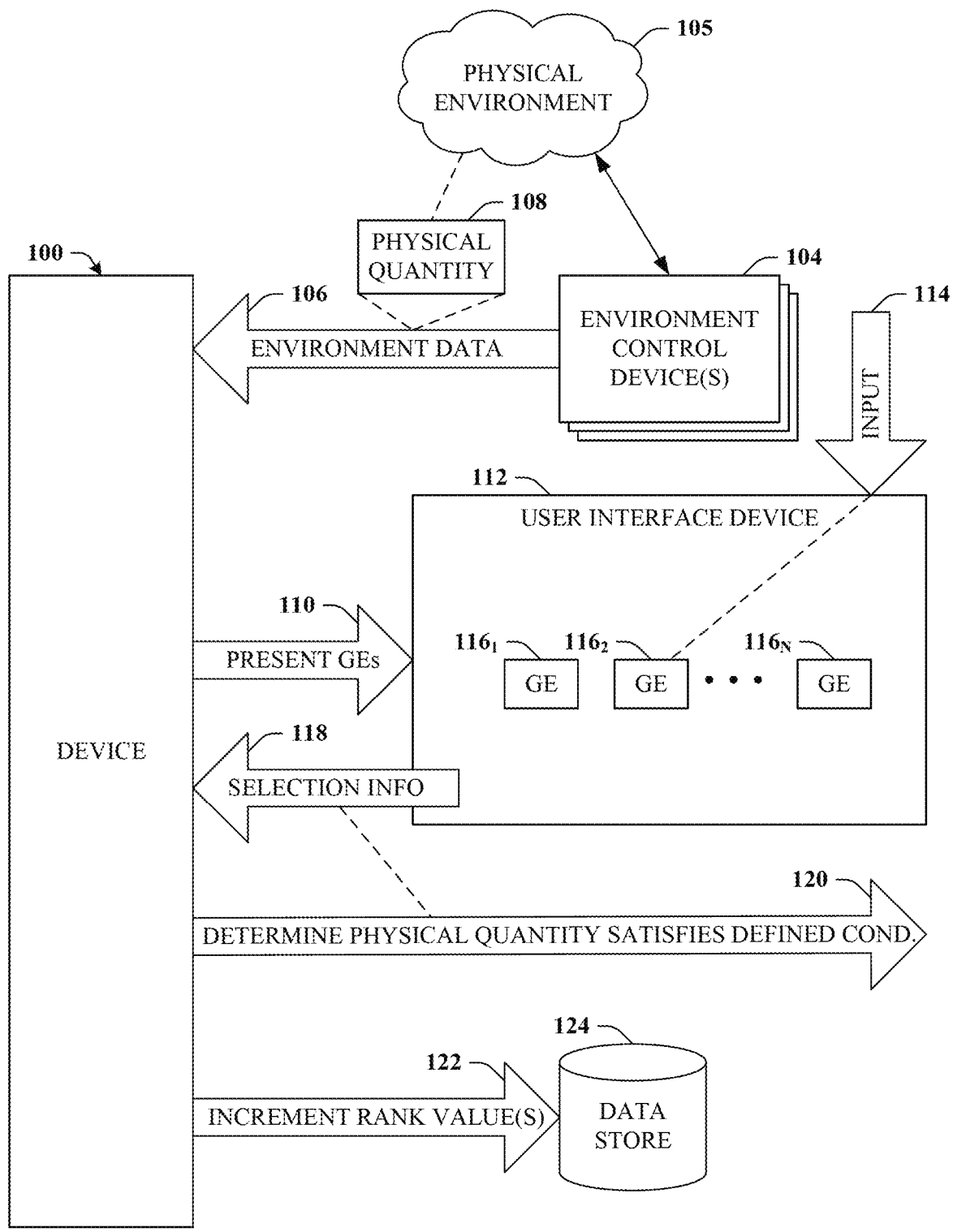
FIG. 1 illustrates a block diagram of an example non-limiting device that can rank graphical elements presented on a user interface (UI) as a function of a physical quantity or condition extant in a physical environment in accordance with one or more embodiments of the disclosed subject matter.

A user interface (UI) for a building automation system (BAS) or another suitable system can provide users with a wealth of information. In existing systems, users can spend a significant amount of time searching through large collections of menus, lists, pages, or other views on the UI before locating the graphical element(s) or other information being searched. As one example, selection of a category type graphical element (e.g., pending alarms, current room temperatures, equipment statuses, etc.) on the UI can lead to one or more very large lists. It can take time to scan through these lists to locate a target item and/or to perform filtering tasks to reduce the size of the list. Currently, there is no satisfactory way to prioritize or persist a presentation. Thus, the steps and time involved in locating important UI elements typically must be substantially repeated each time those UI elements are accessed.

The disclosed subject matter, in some embodiments, is directed to ranking and prioritizing graphical elements, and leveraging this rank to give preferential treatment to highly ranked graphical elements over unranked or lower ranked graphical elements. One benefit can be that a user can more quickly or more efficiently locate highly ranked elements. In some embodiments, the ranking can be based on use. Hence, graphical elements that are commonly selected and/or accessed can be more highly ranked and, thus, more easily located on the UI.

The inventors have observed that many tasks performed on a BAS UI or other suitable UI are sensitive to context. As a representative example, it is observed that many tasks are particularly sensitive to a context provided by certain physical quantities or conditions. For example, when an outside temperature (e.g., a physical quantity) is above 80 degrees, the UI may be frequently used to navigate to a particular page or graphical element such as, e.g., a status of a freezer or associated equipment. However, when the outside temperature is below 25 degrees, that same page or graphical element might be rarely accessed or not at all. Thus, graphical elements of the UI can be assigned multiple ranks, e.g., one for each context. These multiple ranks, as well as other aspects of the disclosed subject matter, can be represented as matrices.

In other words, techniques detailed herein can, in some embodiments, determine (e.g., based on previous behavior) what graphical elements of a UI are important within a particular context, which can exist, for instance, when a physical quantity meets or satisfies a defined threshold. For example, UI elements that are determined to be important can be assigned a high rank value. Once sufficiently determined, these rank values can then be used to arrange one or more views of a UI. For example, when a given context is determined to exist (e.g., outside temperature above 80 degrees), graphical elements having a high rank in that given context can be assigned to locations or areas of the UI that are determined to be more easily accessible.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with initial reference to FIG. 1, a block diagram of an example non-limiting device 100 is depicted. In some embodiments, device 100 can rank graphical elements presented on a user interface (UI) as a function of a physical quantity or condition extant in a physical environment in accordance with one or more embodiments of the disclosed subject matter. In some embodiments, device 100 can rank the graphical elements based on other factors, either in addition to the physical condition or instead of using the physical condition.

It should be understood that in the discussion of the present embodiment and of embodiments to follow, repetitive description of like elements employed in the various embodiments described herein is omitted for sake of brevity. Device 100 can comprise a processor and a memory that stores executable instructions that, when executed by the processor, facilitate performance of operations. Examples of said processor and memory, as well as other suitable computer or computing-based elements, can be found with reference to FIG. 11, and can be used in connection with implementing one or more of the devices or components shown and described in connection with FIG. 1 or other figures disclosed herein Device 100 can be coupled to or interface with one or more environment control device(s) 104. Environment control device 104 can be configured to monitor or manage a physical environment 105. For example, in some embodiments, environment control device 104 can be a sensor, a heating, ventilation, and air conditioning (HVAC) device, or some other device configured to control or monitor a physical environment such as physical environment 105. Physical environment 105 can represent all or a defined portion of an environment that is managed or monitored such as all or a defined portion of an interior of a physical structure such as a building, room, or device, conditions for which can be managed by environment control device(s) 104. Additionally, physical environment 105 can include an exterior portion of the building or device, which can be monitored by certain environment control device(s) 104 or other devices.

Device 100 can receive environment data, which is illustrated by reference numeral 106. Environment data 106 can be received from environment control device(s) 104 and can be indicative of physical quantity 108 of physical environment 105. Various examples of physical quantity 108 are illustrated at FIG. 2.

Figure 2:
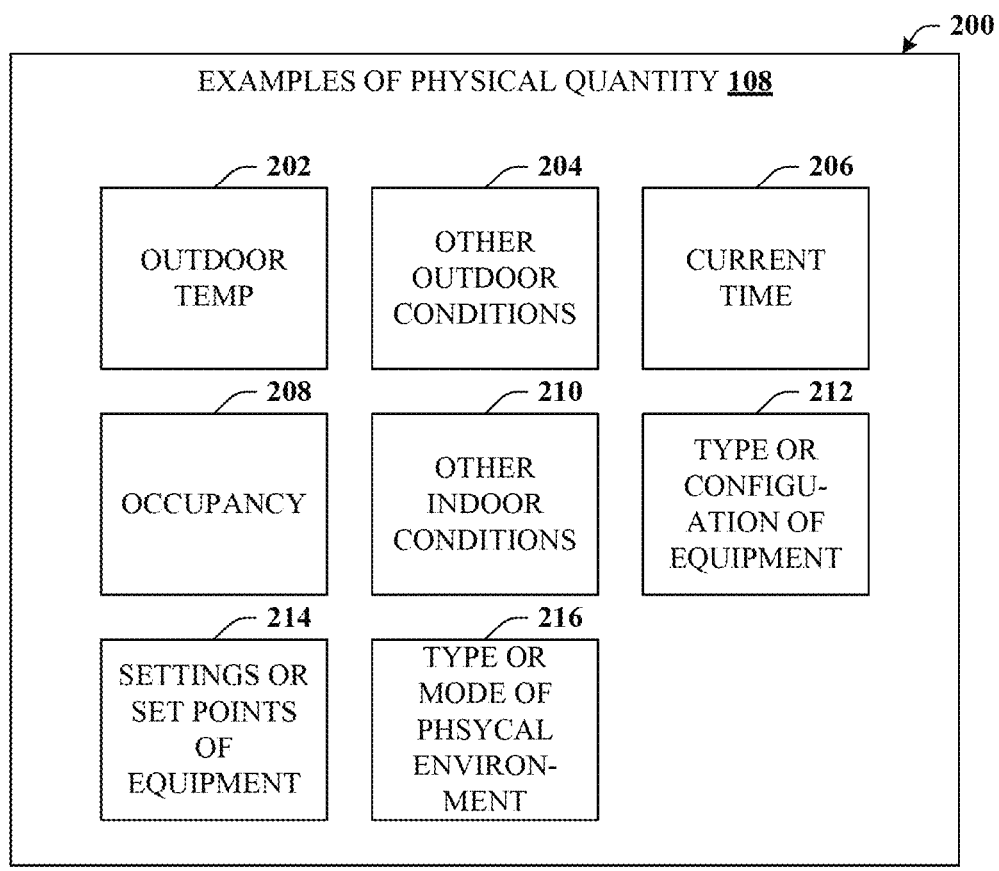
FIG. 2 illustrates a block diagram depicting non-limiting examples of a physical quantity in accordance with one or more embodiments of the disclosed subject matter.

While still referring to FIG. 1, but turning as well to FIG. 2, a block diagram 200 depicts non-limiting examples of physical quantity 108 in accordance with one or more embodiments of the disclosed subject matter. For example, physical quantity 108 can be indicative of outdoor temperature 202 or other outdoor conditions 204 (e.g., sunny, cloudy, raining, snowing, or other weather conditions) at or near at least some portion of physical environment 105. As another example, physical quantity 108 can be indicative of a current time 206 at physical environment, which can reflect a range of times such as morning, afternoon, evening, night, business hours, after-hours, etc.

In some embodiments, physical quantity 108 can be indicative of occupancy 208 and/or a number of persons or other suitable entities in physical environment 105 or some portion of physical environment 105. In some embodiments, physical quantity 108 can be indicative of other indoor conditions 210 such as, e.g., an indoor temperature, humidity, luminance or any other suitable physical condition. In some embodiments, physical quantity 108 can be indicative of a type or configuration of equipment 212 or settings or set points of equipment 214. In some embodiments, physical quantity 108 can be indicative of type or mode 216 of some portion of physical environment 105 which can reflect a type or mode of a facility (e.g., manufacturing, commercial, service, etc.) at physical environment 105 or a type or mode of some portion of physical environment 105 (e.g., dry storage room, refrigerated area, living space, conference room, clean room, botanical area, etc.).

Turning back to FIG. 1, as illustrated by reference numeral 110, device 100 can instruct user interface (UI) device 112 to present a group of graphical elements $116_1$-$116_N$, where N can be substantially any positive integer. It should be understood that graphical elements $116_1$-$116_N$ can be referred to herein, either collectively or individually as graphical element(s) 116, with appropriate subscripts employed generally only when necessary or convenient to highlight various distinctions or to better impart the disclosed concepts.

As noted, UI device 112 can be a UI for a BAS or other suitable system. Graphical elements 116 can be representative of some aspect of physical environment 105 (e.g., a temperature of rooms) or some aspect of environment control device 104 (e.g., a status of equipment controlling or monitoring physical environment 105). In other words, UI device 112 can be configured to display various aspects of graphical elements 116 relating to physical environment 105 and/or the equipment that monitors or manages physical environment 105 such as environment control device(s) 104.

It is understood that UI device 112 can be configured to receive input 114, such as a selection of one or more of graphical elements 116. In some embodiments, selection of a graphical element (GE) 116 can cause a presentation of UI device 112 to change, e.g., to display a sub-menu or list or the like. In some embodiments, GE 116 can provide information about various aspects of physical environment 105. For example, GE 116 can provide information about different portions of physical environment 105, different portions of environment control device(s) 104, different environment control device(s) 104, and so on. In the present example, input 114 selects GE $116_2$. Information regarding the selection of GE $116_2$ can be provided to device 100, illustrated as selection info 118.

In response to selection input 118 and/or in response to input 114 that selects a GE 116 (in this case GE $116_2$), device 100 can determine that physical quantity 108 satisfies a defined condition, which is illustrated as determination 120. Various examples of the defined condition are further detailed in connection with FIGS. 3-5, but as an illustrative example, consider the case where the defined condition relates to occupancy 208 of a certain room within physical environment 105, and specifically indicates that the condition is satisfied if the occupancy of the room is greater than 25. Now, suppose that contemporaneous with input 114 (that selects GE $116_2$) and/or receipt of selection info 118, it is determined that the occupancy of the room is above 25. Thus, when input 114 and/or selection info 118 was received, the example defined condition was determined to be satisfied.

To some extent, a relationship between GE $116_2$ and the defined condition can be inferred in response to determination 120. For example, suppose GE $116_2$ relates to an occupancy status or alarm. In that case, it can be expected that this GE might be accessed at times when certain rooms are crowded but might never or only rarely be accessed at times when rooms are not crowded. Hence, in response to determination 120, device 100 can increment a rank value assigned to GE $116_2$, as exemplified by reference numeral 122. This rank value can be indicative of a contextual rank for GE $116_2$ in the context of the physical quantity satisfying the defined condition. In other words, because GE $116_2$ was accessed when a certain condition was determined to be satisfied, it can be inferred that when that condition is satisfied, a user will be more likely to access GE $116_2$. Thus, a rank value for that condition being satisfied can be incremented in order to weight that very relationship. Rank values, defined conditions, and all other information or data detailed herein can be stored at least in part to data store 124, which can be local or remote. In some embodiments, these rank values can be assigned as part of a learning period in which device 100 can be trained in the relationships between selections of GE 116 and physical conditions that are concurrently extant, as further illustrated at FIG. 3.

Figure 3:
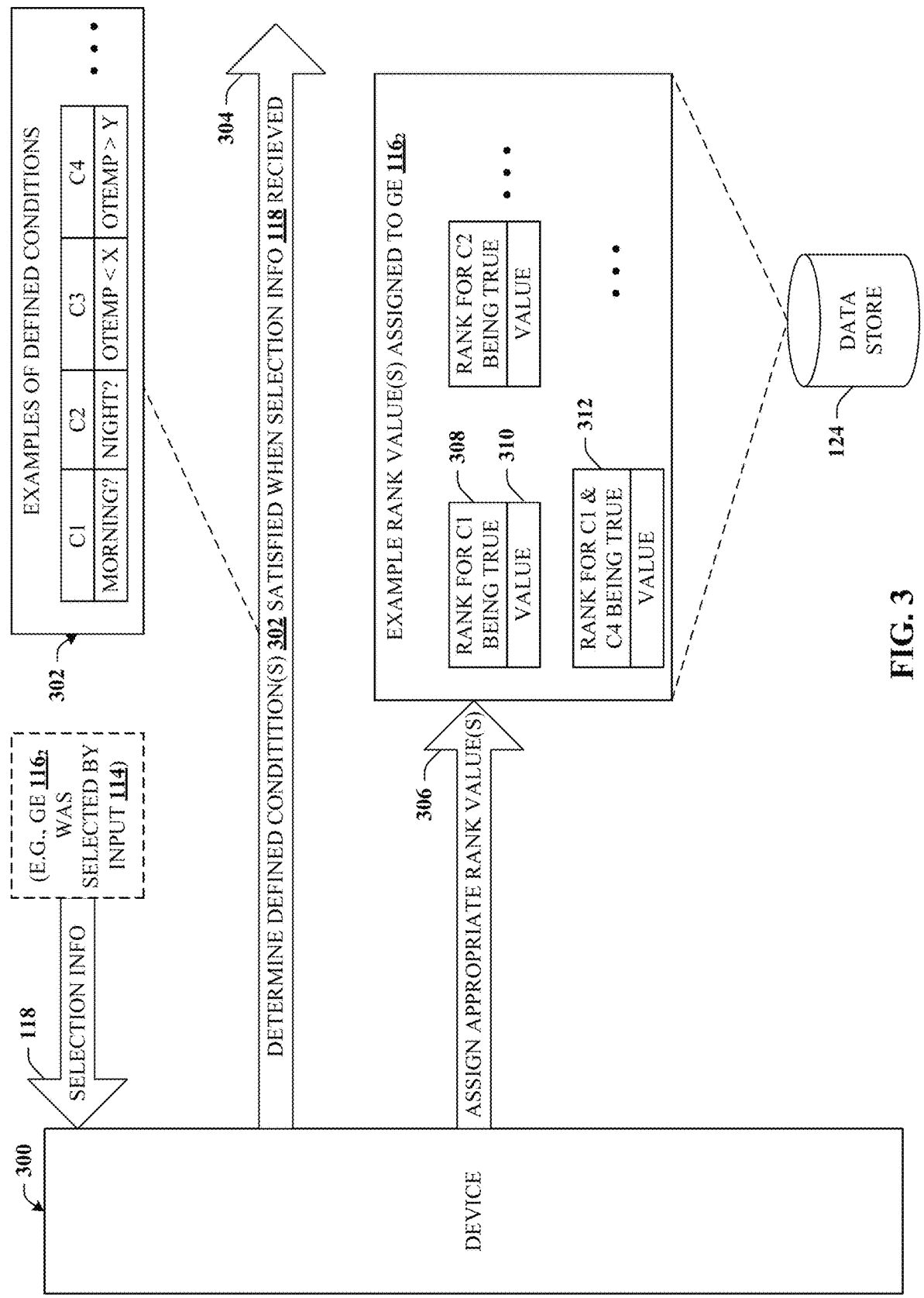
FIG. 3 illustrates a block diagram of an example device that can provide for a learning procedure that learns from behavior that occurs concurrently with physical conditions being satisfied in accordance with one or more embodiments of the disclosed subject matter.

With reference now to FIG. 3, a block diagram of an example non-limiting device 300 is depicted. Device 300 can provide for a learning procedure that learns from behavior that occurs concurrently with physical conditions being satisfied in accordance with one or more embodiments of the disclosed subject matter. For example, block 302 illustrates a few exemplary defined conditions relating to time and outside temperature. It is appreciated that many other conditions are contemplated, with only a few shown here for the sake of brevity.

Typically, defined conditions 302 represent conditions relating to physical quantity 108, examples of which were given at FIG. 2. Additionally, or alternatively, defined conditions can relate to other factors, which might not be related to physical quantity 108. A non-exhaustive list can include: time of day, user ID, user role (e.g., access to objects, level of access relative to GE 116 type, view access to variable air volume (VAV) boxes vs. full access to chillers, etc.), equipment type (e.g., VAV, air handler unit (AHU) chiller, blower coil, etc.), application mode, facility occupancy, facility type, page interface time duration, number of times page is visited (e.g., relative to other factors listed here), user language, user region, time zone, outdoor conditions, weather, interface platform (e.g., mobile vs. PC), home page contents, custom graphic contents (e.g., does the collection of points represent something greater?), alarm configuration, local setpoint usage, source/load relationship (e.g., chiller (source) and AHU (load)), data log collection frequency (e.g., finer granularity can equate to greater presence) data log source quantities (e.g., more data logs of the same source can equate to greater presence across system), point state (e.g., in alarm vs. nominal), and so forth.

Regardless of the type or nature of defined conditions 302, as illustrated by determination 304, when selection info 118 is received, it can be determined which, if any, defined conditions 302 are satisfied. For example, when selection info 118 is received, is it morning (e.g., C1), night (e.g., C2), or some other time or period? When selection info 118 is received, is the outside temperature below a certain value or range (e.g., C3) or above a certain value or range (e.g., C4)? Depending on which defined conditions 302 are satisfied when selection info 118 is received, appropriate rank values can be assigned, as illustrated by reference numeral 306. For example, if input 114 selects GE $116_2$ and, concurrently, it is determined that it is morning (e.g., between 6:00 AM and 12:00 PM), then C1 can be determined to be satisfied at the time when GE $116_2$ was selected. Thus, value 310, for data structure 308 (representing a rank for C1 being true), can be incremented.

As illustrated, GE $116_2$ can maintain multiple ranks, for instance, a separate rank for each or a subset of all defined conditions 302. Likewise, each GE 116 can have similar data structures to track various rank values 310. In some embodiments, rank values 310 can be tracked based on a union or combination of defined conditions 302 being satisfied or true. For example, data structure 312 represents a rank for both C1 and C4 (e.g., defined conditions 302) being true when selection info 118, that GE $116_2$ was selected, was received. Rank values, defined conditions 302, and other suitable data relating to device 300 can be stored in data store 124. In some embodiments, embodiments, rank values can be stored as matrices, which can further the learning procedure as detailed in connection with FIGS. 4A-5.

Figure 4A:
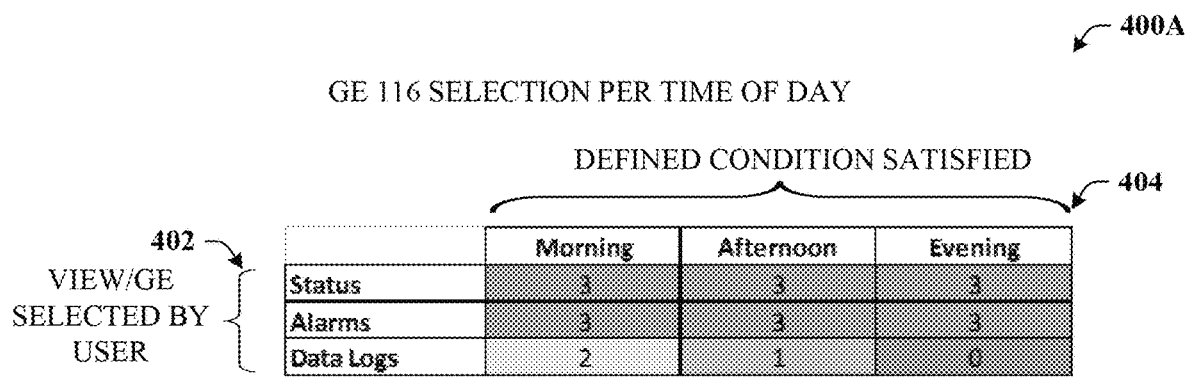
FIGS. 4A-4C illustrates example diagrams representing example data patterns that can be employed during a learning procedure in accordance with one or more embodiments of the disclosed subject matter
Figure 4B:
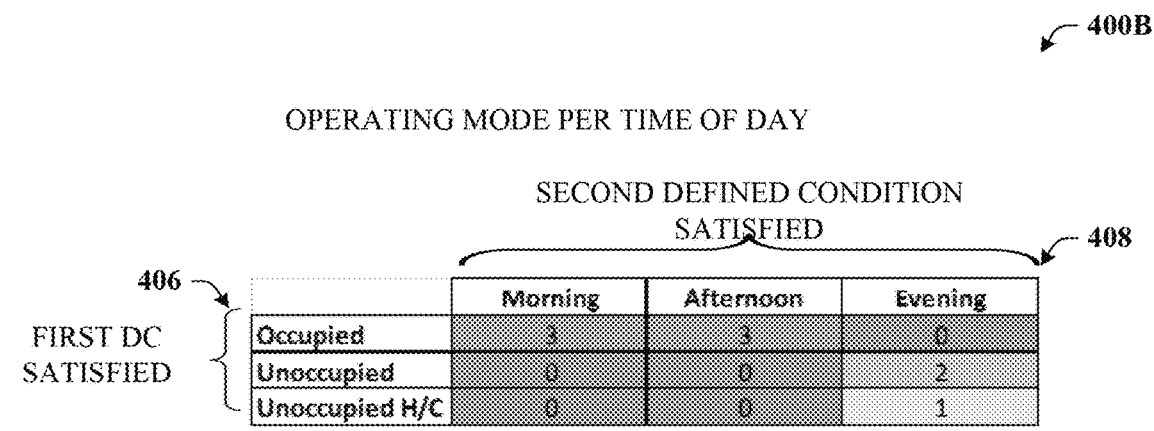
Figure 4C:
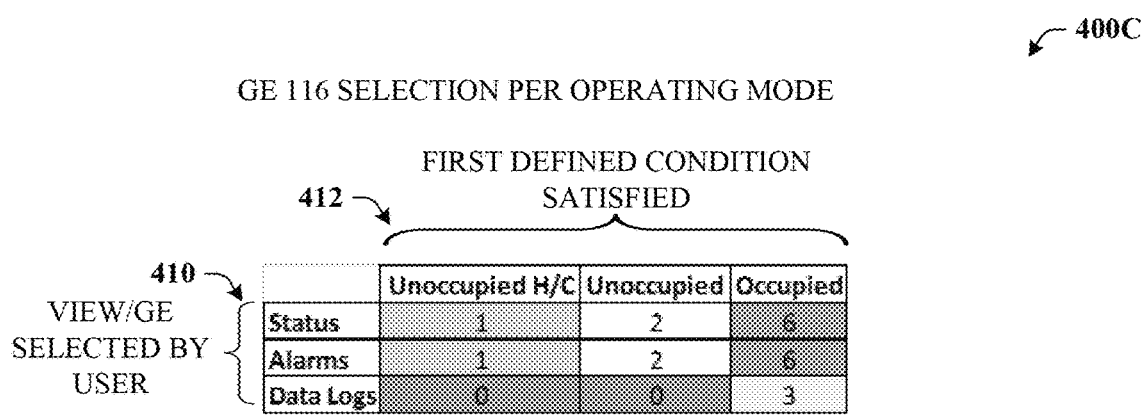

Referring now to FIGS. 4A-4C, diagrams 400A-400C are presented. Diagrams 400A-400C represent example data patterns that can be employed during a learning procedure in accordance with one or more embodiments of the disclosed subject matter. For example, diagram 400A represents GEs (e.g., GE 116) being selected per time of day. The first column, identified by reference numeral 402, represents the views or GEs 116 that were selected by a user. Columns 2-4 indicated by reference numeral 404 represent which defined condition was satisfied when the particular GE 116 or view was selected by the user.

Diagram 400B represents an example operating mode per time of day. The first column, identified by reference numeral 406, represents a first defined condition being satisfied, which is linked to the listed operating modes (e.g., occupied mode, unoccupied mode, unoccupied heating/cooling mode). Columns 2-4 indicated by reference numeral 408 represent a second defined condition being satisfied. In this case the second defined condition relates to a time of day.

Diagram 400C represents an example GE 116 selection per operating mode (e.g., the first condition). The first column, identified by reference numeral 410, represents the views or GEs 116 that were selected by a user. Columns 2-4 indicated by reference numeral 412 identify concurrences of the first defined condition being satisfied when the particular GE 116 or view was selected by the user.

Figure 5:
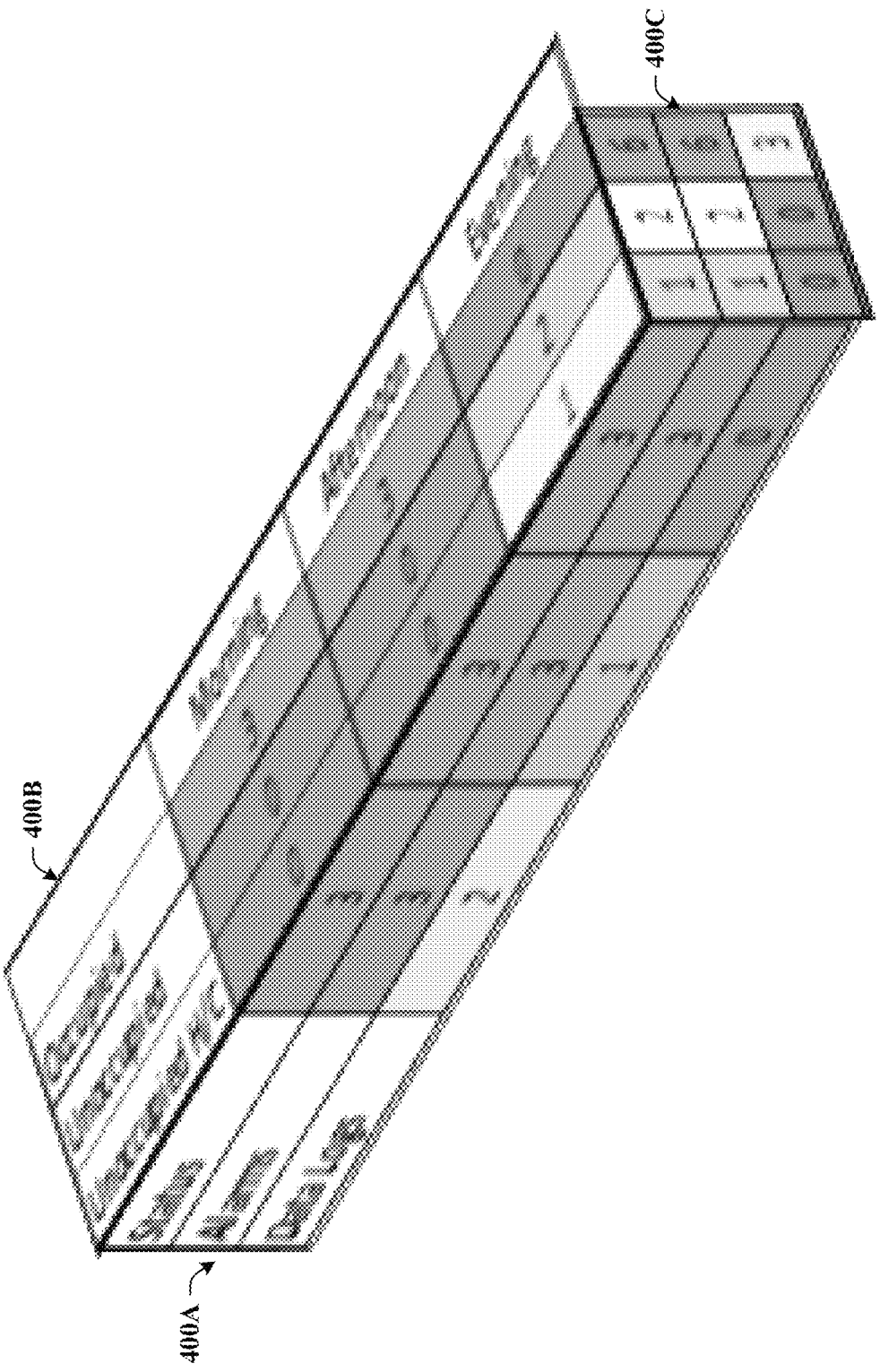
FIG. 5 illustrates a graphical depiction representing an example pattern matrix that can be employed by the learning procedure in accordance with one or more embodiments of the disclosed subject matter.

Turning now to FIG. 5, graphical depiction 500 is presented. Depiction 500 represent an example pattern matrix that can be employed by the learning procedure in accordance with one or more embodiments of the disclosed subject matter. In this example, the matrix is represented as a graphical combination of diagrams 400A-400C of FIGS. 4A-4C. As depicted, data detailed herein in this form is well-suited to matrix-type representation.

In some embodiments, a determination can be made (e.g., during the learning procedure) that enough data has been collected to establish a pattern of behavior (e.g., which GEs 116 are accessed relative to defined conditions being met). Once this determination is made, the disclosed techniques can, in some embodiments, leverage the pattern matrix (or another suitable data representation) to predict which GEs 116 or UI views, applications, tools, etc. are favored. As noted, in addition to, or alternative to, making such determinations based on physical quantities 108 and the related defined conditions 302, such determinations or decisions can be made based on other factors such as, e.g., on a per user basis (e.g., user ID), on a per device basis, and so forth.

When a given view (e.g., GEs 116, applications, tools, etc.) is determined to be favored, a presentation of UI device 112 can be adjusted on the fly to favor GEs 116 with higher rank values by placing those highly ranked GEs 116 in readily accessible locations on the presentation. An advantage is that, when a certain condition is determined to be true (e.g., outside temperature above 80 degrees), users of UI device 112 are less likely to waste time searching for GEs 116 or views that are likely to be accessed. These and other embodiments are further described with reference to FIG. 6.

In some embodiments, in addition to enhancing UI device 112 interaction, the learning procedure can be further leveraged to make certain decisions. For example, the information learned about a particular user or system can be further employed to automatically update settings of environment control device(s) 104 or the like. For instance, in the absence of user interaction, the system can initiate operations such as set point control, application optimization, alarm routing, and so forth. As a non-exhaustive list, the pattern matrix or other information collected by devices detailed herein can be employed to provide predictive setpoint control, self-tuning systems (e.g., for a building or BAS), energy optimization, programming and commissioning estimation (e.g., to reconcile with assumed estimates), predictive maintenance, system protection, and so forth.

Figure 6:
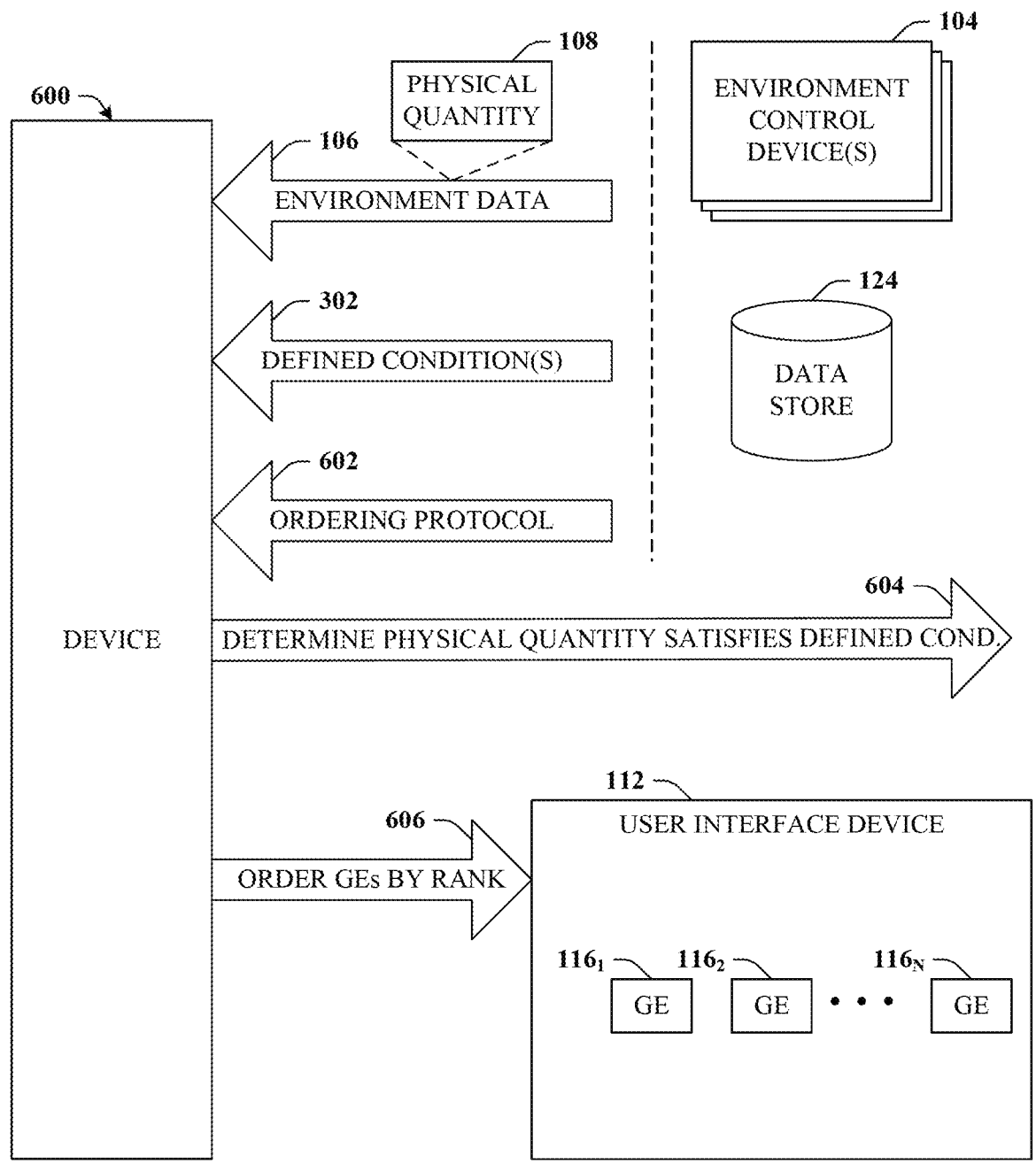
FIG. 6 illustrates a block diagram of an example device that can present graphical elements on a user interface (UI) as a function of a physical quantity or condition extant in a physical environment in accordance with one or more embodiments of the disclosed subject matter.

Turning now to FIG. 6, a block diagram of an example non-limiting device 600 is depicted. In some embodiments, device 600 can present graphical elements on a user interface (UI) as a function of a physical quantity or condition extant in a physical environment in accordance with one or more embodiments of the disclosed subject matter. For example, device 600 can receive environment data 106 that can be indicative of physical quantity 108. Environment data 106 can be received from environment control device(s) 104, from data store 124, or from another suitable source.

Device 600 can further receive defined conditions 302 and ordering protocol 602, which can be retrieved from data store 124 or another suitable source. Defined conditions 302 can relate to conditions that are satisfied when physical quantity 108 is at a certain value or within a certain range. Ordering protocol 602 is further detailed below.

Device 600 can interface to UI device 112. As noted, UI device 112 can be configured to present a group of GEs 116 that are representative of physical environment 105 and/or environment control device(s) 104. With regard to determination 604, device 600 can determine that physical quantity 108 satisfies one or more defined condition 302 (e.g., rainy weather outside). In response to determination 604, device 600 can instruct UI device 112 to present the group of GEs 116 according to ordering protocol 602.

Ordering protocol 602 can be configured or defined to order GEs 116 by a respective rank value. As detailed in connection with FIG. 3, this rank value can be assigned as a function of defined condition 302 (e.g., rainy weather outside) being determined to be satisfied. In other words, device 600 can instruct UI 112 to order GEs 116 by rank value, as illustrated at reference numeral 606.

Figure 7:
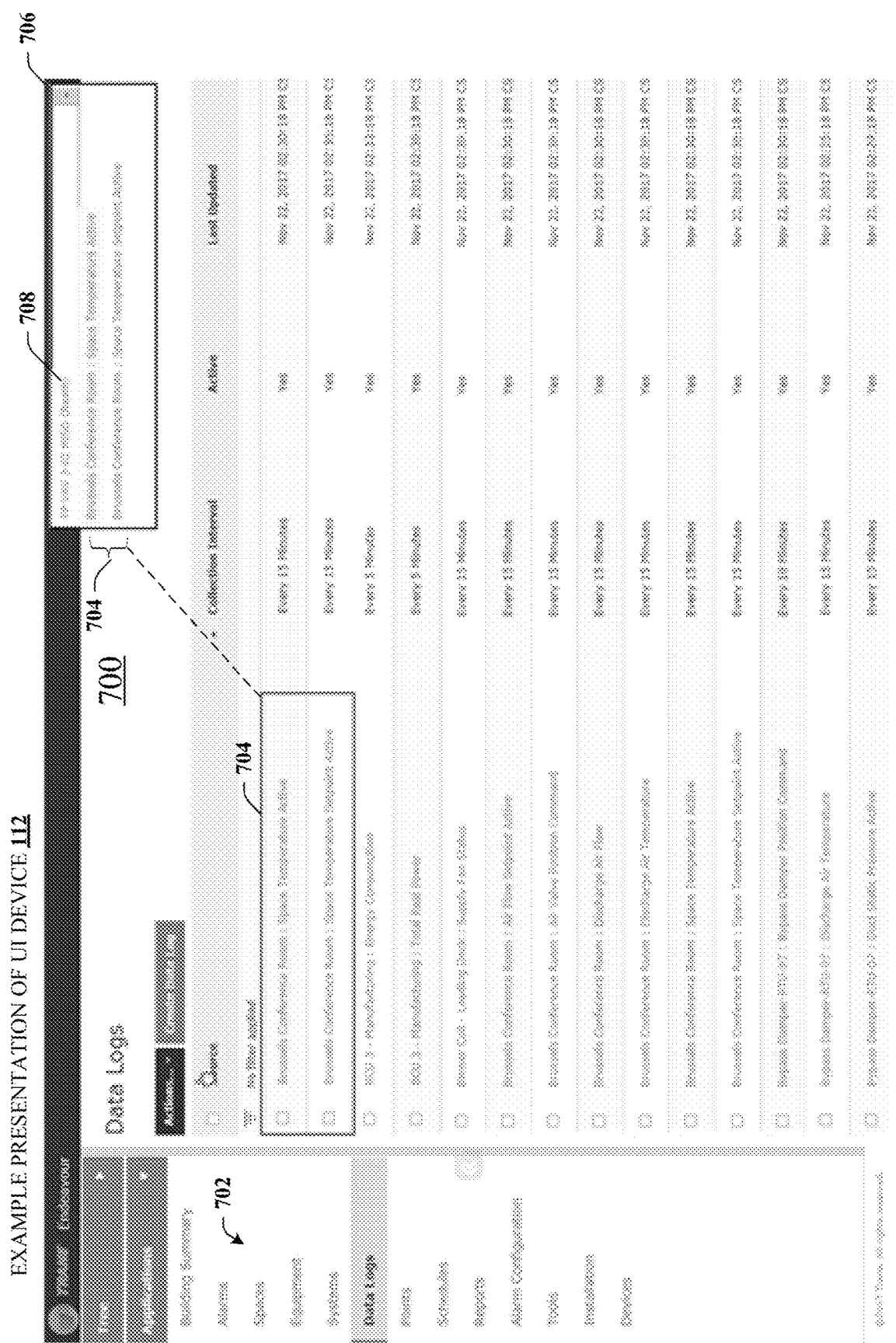
FIG. 7 illustrates a graphical depiction of a presentation by a UI device, illustrating favorable placement of high-ranking graphical elements in accordance with one or more embodiments of the disclosed subject matter.

In some embodiments, ordering protocol 602 can assign a GE 116 having a highest rank value to a location, within a presentation of UI device 112, that is determined to be readily accessible. FIG. 7 provides one non-limiting example presentation.

While still referring to FIG. 6, but turning now as well to FIG. 7, an example presentation 700 of UI device 112 is depicted, illustrating favorable placement of high-ranking graphical elements in accordance with one or more embodiments of the disclosed subject matter. In this example, presentation 700 contains some global graphical elements 702 that are generally always visible and thus presented independently of a respective category, context, or view of UI device 112 and/or presentation 700.

Other elements of presentation 700 are presented as a list. In this case, the user has selected "Data Logs" (e.g., a GE 116) and is presented with a list of additional GEs 116 that fit the "Data Logs" category. Within that list, box 704 encloses the two highest-ranking GEs 116. Because these two GEs 116 are the highest-ranking GEs 116 within the "Data Logs" view and within the context of the defined condition being true (e.g., rainy weather outside), those two GEs 116 are presented first on the list.

As illustrated here, in some embodiments presentation 700 can include global rank element (GRE) 706 that can persist independently of a view provided by presentation 700. In this example, GRE 706 is a drop-down element, but other types of objects or elements are contemplated. By selecting GRE 706 a current list of highly ranked GEs 116 can be presented. As shown, the list includes the two GEs 116 included in box 704, but also includes GE 708.

It is noted, that presentation 700 is currently presenting a "Data Logs" view and the two GEs 116 of box 704 are included in that view, but GE 708 is not. Hence, GRE 706 can present GEs 116 even when the view or context of presentation 700 reflects different aspects. Rather, GRE 706 can present those GEs 116 that have a high rank (irrespective of a current main screen view) in the context of the defined condition being true (e.g., rainy weather outside). If the defined condition stops being satisfied, or changes, or if other physical quantities 108 change, then the contents of GRE 706 and box 704 can change as well.

Figure 8A:
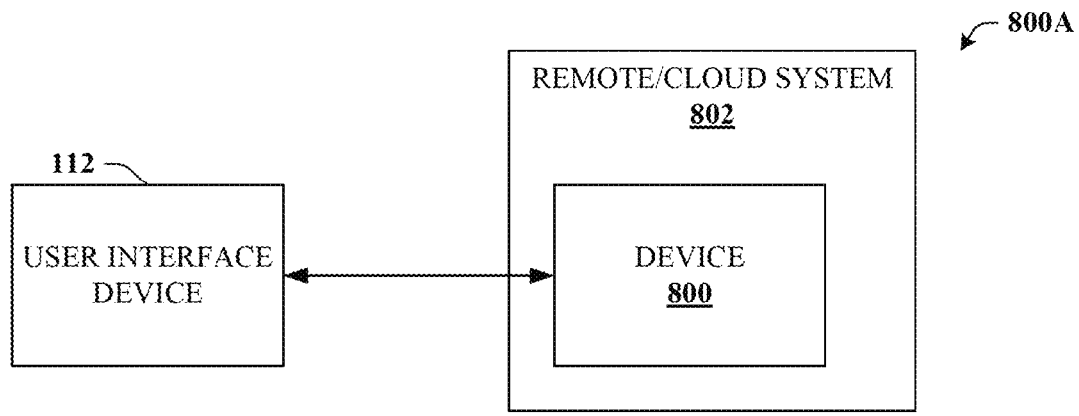
FIGS. 8A-C illustrate block diagrams of example architectural implementations that can be employed in accordance with one or more embodiments of the disclosed subject matter.
Figure 8B:
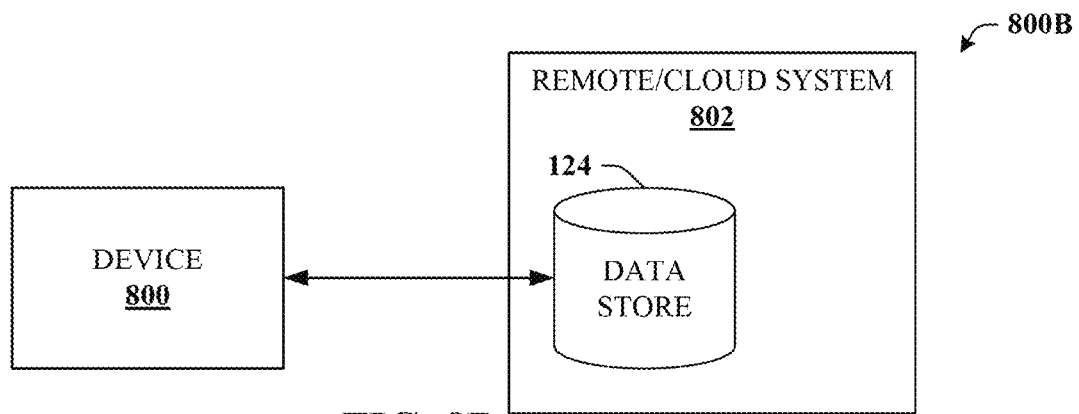
Figure 8C:
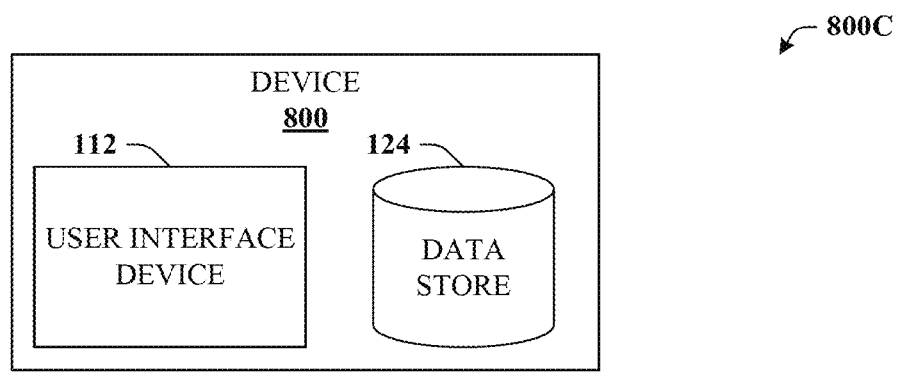

Turning now to FIGS. 8A-8C, various block diagrams 800A-800C of example architectural implementations are illustrated in accordance with one or more embodiments of the disclosed subject matter.

For example, block diagram 800A depicts an example architectural design in which device 800 is situated in a remote system such as a cloud system 802. Device 800 can be representative of all or a portion of devices 100, 300, or 600 as described herein.

Block diagram 800B depicts an example architectural design in which data store 124 in a remote system such as a cloud system 802. In this embodiment, device 800 can be situated at a user site and communicate with the cloud to create or update rank values, defined conditions, or other information of data store 124 or retrieve rank values, defined conditions, ordering protocol, or other information of data store 124. In other embodiments, both device 800 and data store 124 can be situated in cloud system 802 and communicate with UI device 112 situated at the user site.

Block diagram 800C depicts an example architectural design in which one or both user interface device 112 and data store 124 are components of device 800, which can be situated at the user site.

Example Methods

Figure 9:
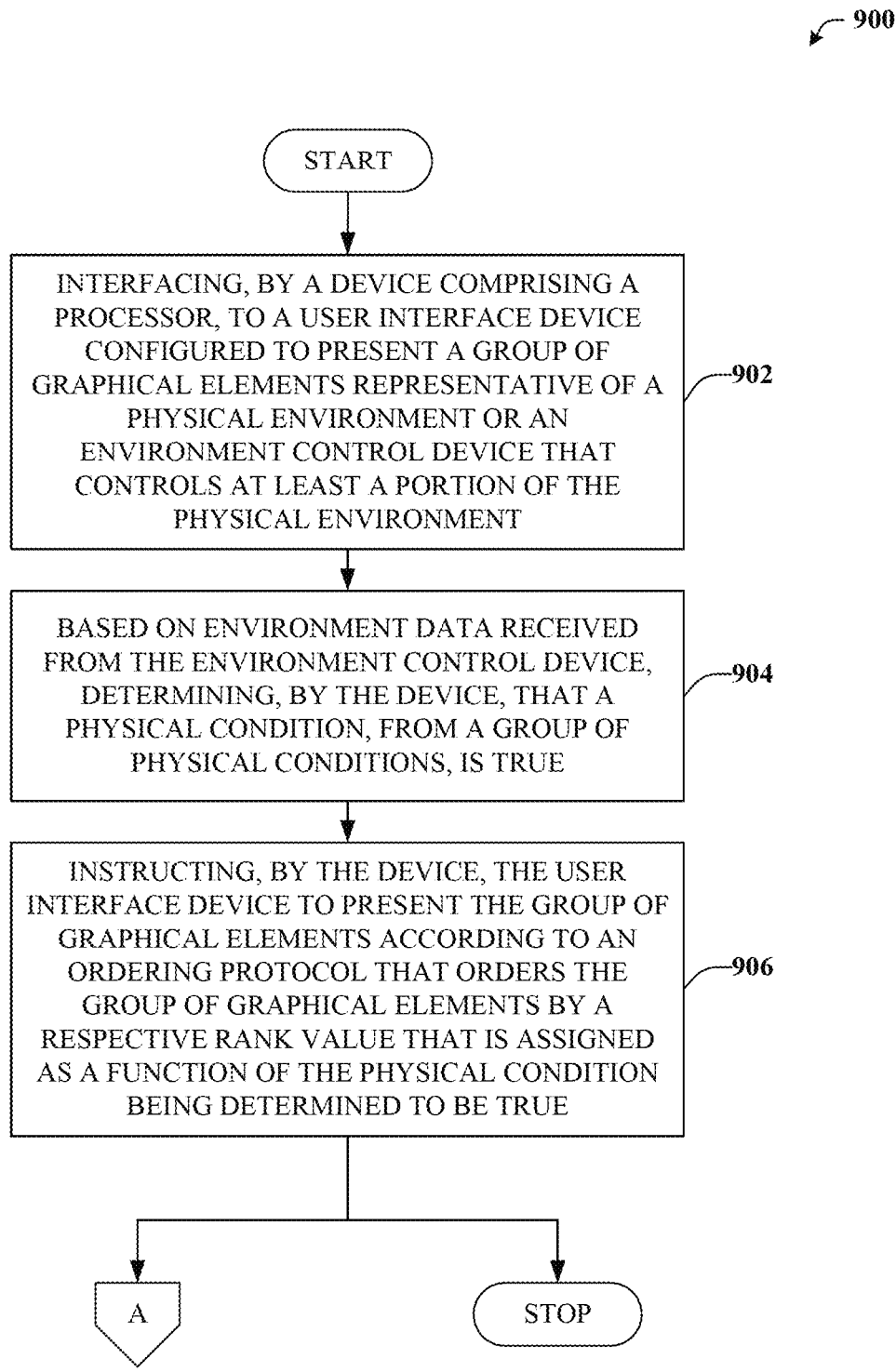
FIG. 9 illustrates a flow diagram of an example, non-limiting computer-implemented method that can present graphical elements on a UI as a function of a physical quantity or condition extant in a physical environment in accordance with one or more embodiments of the disclosed subject matter.
Figure 10:
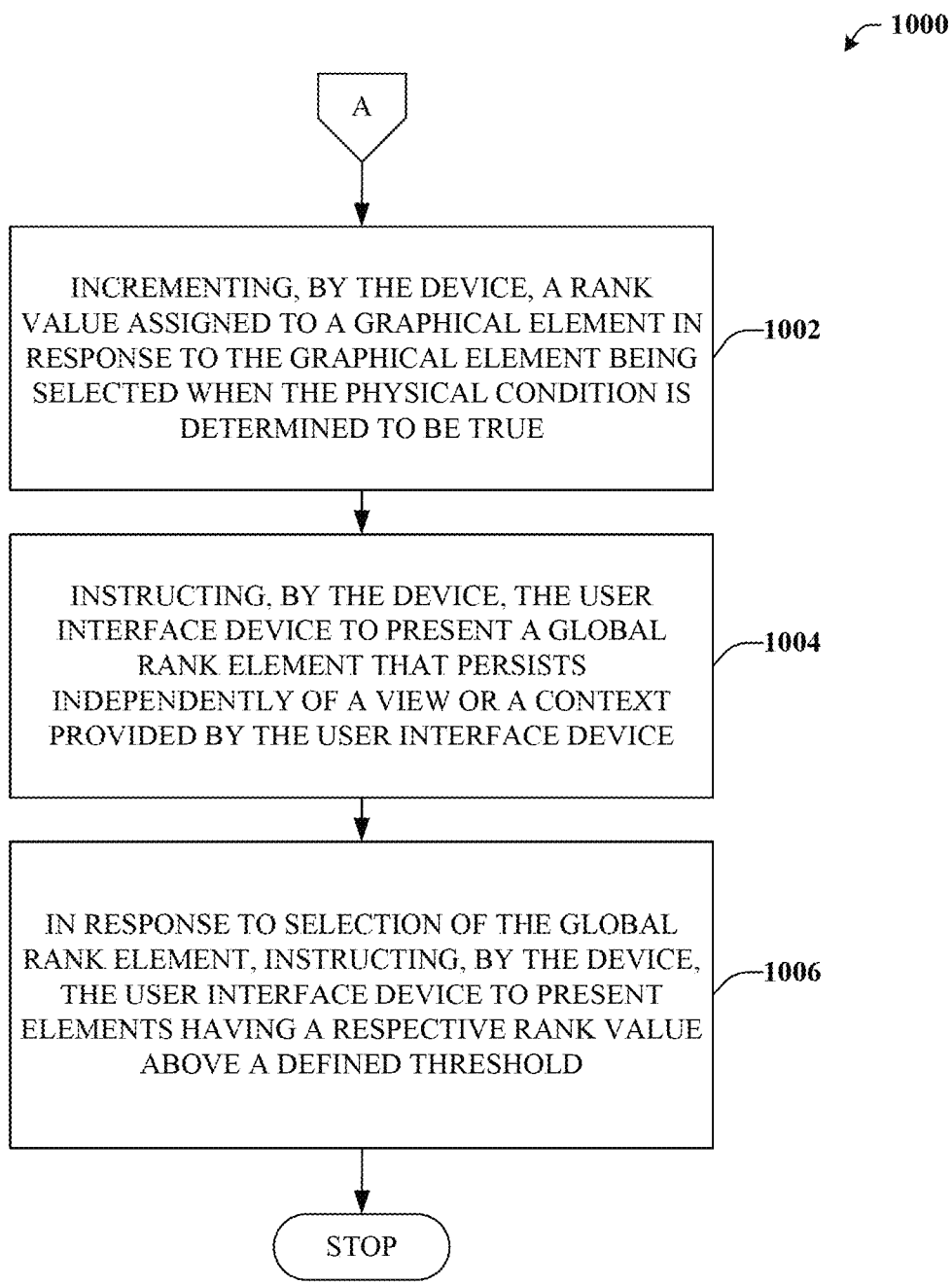
FIG. 10 illustrates a flow diagram of an example, non-limiting computer-implemented method providing additional aspects or elements in connection with presenting graphical elements on a UI as a function of a physical quantity in accordance with one or more embodiments of the disclosed subject matter.

FIGS. 9 and 10 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 9 illustrates a flow diagram 900 of an example, non-limiting computer-implemented method that can present graphical elements on a UI as a function of a physical quantity or condition extant in a physical environment in accordance with one or more embodiments of the disclosed subject matter. For example, at reference numeral 902, a device (e.g., device 600) comprising a processor can interface to a UI device. The UI device can be configured to present a group of graphical elements. The group of graphical elements can be representative of a physical environment or an environment control device that controls at least a portion of the physical environment.

Based on environment data received from the environment control device, at reference numeral 904, the device can determine that a physical condition is true. The physical condition can be selected from a group of physical conditions and can relate to a physical quantity of the physical environment being at a defined level or within a defined range.

At reference numeral 906, the device can instruct the UI device to present the group of graphical elements according to an ordering protocol. The ordering protocol can be configured or defined to order the group of graphical elements by a respective rank value that is assigned as a function of the physical condition being determined to be true. Method 900 can proceed to insert A, which is further detailed in connection with FIG. 10, or terminate.

Turning now to FIG. 10, illustrated is a flow diagram 1000 of an example, non-limiting computer-implemented method that can present graphical elements on a UI as a function of a physical quantity in accordance with one or more embodiments of the disclosed subject matter. At reference numeral 1002, the device can increment a rank value assigned to a graphical element in response to the graphical element being selected when the physical condition is determined to be true. A given graphical element can have multiple rank values, for example, one for each physical condition that is tracked.

At reference numeral 1004, the device can instruct the UI device to present a global rank element that persists independently of a view or a context provided by the user interface device.

At reference numeral 1006, in response to selection of the global rank element, the device can instruct the UI device to present elements having a respective rank value above a defined threshold. For example, the graphical elements presented by the global rank element can be based on a given defined condition, relating to a physical quantity, being determined to be true or satisfied.

Example Operating Environments

An example embodiment can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 11, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 11:
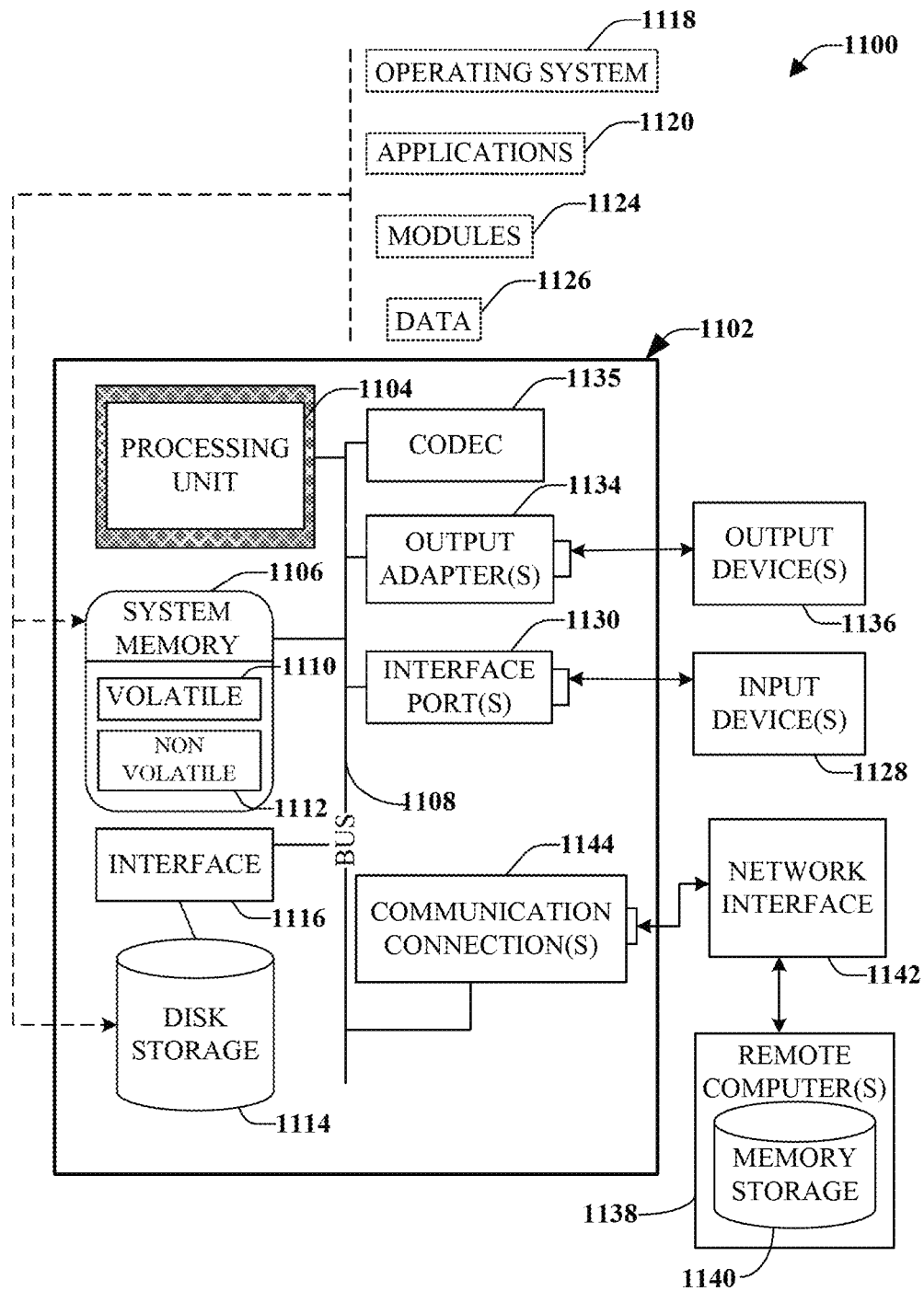
FIG. 11 illustrates a block diagram of an example, non-limiting operating environment in which one or more embodiments described herein can be facilitated.

With reference to FIG. 11, an example environment 1100 for implementing various aspects of the claimed subject matter includes a computer 1102. The computer 1102 includes a processing unit 1104, a system memory 1106, a codec 1135, and a system bus 1108. The system bus 1108 couples system components including, but not limited to, the system memory 1106 to the processing unit 1104. The processing unit 1104 can be any of various available processors such as an ARM Cortex A7 processor that can be implemented on a Digi ConnectCore 6UL module or the like. Dual microprocessors and other multiprocessor architectures also can be employed as the processing unit 1104.

The system bus 1108 can be any of several types of bus structure(s) including the memory bus or memory controller, a peripheral bus or external bus, or a local bus using any variety of available bus architectures or protocols including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI) Serial Peripheral Interface (SPI), inter-integrated circuit (I2C), embedded Multi-Media Controller (eMMC), Universal Synchronous/Asynchronous Receiver/Transmitter (USART), Secure Digital (SD) Double Data Rate Type 3 (DDR3), and Open NAND Flash interface (ONFI).

The system memory 1106 includes volatile memory 1110 and non-volatile memory 1112, which can employ one or more of the disclosed memory architectures, in various embodiments. The basic input/output system (BIOS), containing the basic routines to transfer information between elements within the computer 1102, such as during start-up, is stored in non-volatile memory 1112. In addition, according to present innovations, codec 1135 can include at least one of an encoder or decoder, wherein the at least one of an encoder or decoder can consist of hardware, software, or a combination of hardware and software. Although, codec 1135 is depicted as a separate component, codec 1135 can be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), Flash memory, 3D Flash memory, or resistive memory such as resistive random-access memory (RRAM). Non-volatile memory 1112 can employ one or more of the disclosed memory devices, in at least some embodiments. Moreover, non-volatile memory 1112 can be computer memory (e.g., physically integrated with computer 1102 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1110 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1102 can also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD), flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116. It is appreciated that storage devices 1114 can store information related to a user. Such information might be stored at or provided to a server or to an application running on a user device. In one embodiment, the user can be notified (e.g., by way of output device(s) 1136) of the types of information that are stored to disk storage 1114 or transmitted to the server or application. The user can be provided the opportunity to opt-in or opt-out of having such information collected or shared with the server or application (e.g., by way of input from input device(s) 1128).

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a resistive touch pad, capacitive touch pad, a pointing device such as a mouse, trackball, stylus, touch pad, keyboard, microphone, joystick, or game pad; a satellite dish, a scanner, a TV tuner card, a digital camera, a digital video camera, a web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s) 1128. Thus, for example, a USB port can be used to provide input to computer 1102 and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor-based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a user interface of a device connected to an HVAC system, the method comprising:
    at a first point in time:
        making a first determination that a first condition is occurring;
        making a second determination that a graphical element on the user interface is being accessed while the first condition is occurring, the graphical element comprising a first rank value associated with the first condition, and the graphical element being at a first display position on the user interface when the graphical element is being accessed while the first condition is occurring; and
        incrementing, in response to the second determination, the first rank value of the graphical element to obtain an incremented first rank value; and
    at a second point in time after the first point in time and after the first condition has passed:
        making a third determination that the first condition is occurring again, the graphical element being at a second display position different from the first display position after the first condition has passed and before the first condition has reoccurred;
        adjusting, in response to the third determination, the second display position of the graphical element based on the incremented first ranking value to obtain an adjusted display position for the graphical element on the user interface, the adjusted display position being different from the second display position; and
        displaying the graphical element on the user interface at the adjusted display position, wherein the first condition is at least one of an activation of an alarm of the HVAC system or detection of an environmental condition of a space being serviced by the HVAC system,
    wherein further at the first point in time: a plurality of other conditions different from the first condition are occurring simultaneously with the first condition; making the second determination further comprises determining that the graphical element is being accessed while the first condition and the plurality of other conditions are all occurring; the graphical element further comprises additional rank values different from the first rank value, each of the additional rank values are associated with at least one of the plurality of other conditions; and each of the additional rank values are incremented in response to the determining that the graphical element is being accessed while the first condition and the plurality of other conditions are all occurring,
    wherein each of the first rank value and the additional rank values are associated with a condition-graphical element pair comprising the graphical element and a respective one of the first condition and the plurality of other conditions, and
    wherein the method further comprises:
        generating a pattern of behavior using a pattern matrix comprising multiple ones of the condition-graphical element pair, the pattern matrix being for a first user among users of the device;
        associating the pattern of behavior with the first user; and
        in response to a fourth determination that the first user is using the device, adjusting the second display position of the graphical element on the user interface based on the pattern of behavior during reoccurrence of any combination of the first condition and the plurality of other conditions after the first point in time.

2. The method of claim 1, wherein the second display position is at a position on the user interface that is not visible to a user.

3. The method of claim 1, wherein the graphical element is a page or view of the user interface.

4. The method of claim 3, wherein the page or view comprises at least one of a status of equipment associated with the HVAC system or a condition of a physical environment of a space being serviced by the HVAC system.

5. The method of claim 1, wherein the pattern matrix further comprises a plurality of condition-condition pairs, each of the plurality of condition-condition pairs comprises the first condition in combination with one of the plurality of other conditions, and each of the plurality of condition-condition pairs is associated with one of the additional rank values of the graphical element.

6. A device comprising:
    a processor; and
    a memory that stores executable instructions that, when executed by the processor, facilitate performance of operations for managing a user interface of the device, the device being connected to an HVAC system and the operations comprise:
        at a first point in time:
            making a first determination that a first condition is occurring;
            making a second determination that a graphical element on the user interface is being accessed while the first condition is occurring, the graphical element comprising a first rank value associated with the first condition, and the graphical element being at a first display position on the user interface when the graphical element is being accessed while the first condition is occurring; and incrementing, in response to the second determination, the first rank value of the graphical element to obtain an incremented first rank value; and at a second point in time after the first point in time and after the first condition has passed:

making a third determination that the first condition is occurring again, the graphical element being at a second display position different from the first display position after the first condition has passed and before the first condition has reoccurred;

adjusting, in response to the third determination, the second display position of the graphical element based on the incremented first ranking value to obtain an adjusted display position for the graphical element on the user interface, the adjusted display position being different from the second display position; and displaying the graphical element on the user interface at the adjusted display position, wherein the first condition is at least one of an activation of an alarm of the HVAC system or detection of an environmental condition of a space being serviced by the HVAC system, wherein further at the first point in time: a plurality of other conditions different from the first condition are occurring simultaneously with the first condition; making the second determination further comprises determining that the graphical element is being accessed while the first condition and the plurality of other conditions are all occurring; the graphical element further comprises additional rank values different from the first rank value, each of the additional rank values are associated with at least one of the plurality of other conditions; and each of the additional rank values are incremented in response to the determining that the graphical element is being accessed while the first condition and the plurality of other conditions are all occurring, wherein each of the first rank value and the additional rank values are associated with a condition-graphical element pair comprising the graphical element and a respective one of the first condition and the plurality of other conditions, and wherein the operations further comprising:

generating a pattern of behavior using a pattern matrix comprising multiple ones of the condition-graphical element pair, the pattern matrix being for a first user among users of the device;

associating the pattern of behavior with the first user; and in response to a fourth determination that the first user is using the device, adjusting the second display position of the graphical element on the user interface based on the pattern of behavior during reoccurrence of any combination of the first condition and the plurality of other conditions after the first point in time.

\* \* \* \* \*